Aug. 31, 1965   W. R. PRATT   3,203,774
METHOD OF MAKING AN ABRASIVE CUT-OFF DISK
Original Filed May 8, 1959

United States Patent Office 3,203,774
Patented Aug. 31, 1965

3,203,774
METHOD OF MAKING AN ABRASIVE
CUT-OFF DISK
Willard R. Pratt, Rochester, N.Y., assignor to Vanguard Abrasive Corporation, Le Roy, N.Y., a corporation of New York
Original application May 8, 1959, Ser. No. 811,956, now Patent No. 3,028,710, dated Apr. 10, 1962. Divided and this application Dec. 1, 1961, Ser. No. 156,243
5 Claims. (Cl. 51—293)

This application is a division of application Serial No. 811,956, filed May 8, 1959, now Patent 3,028,710, granted April 10, 1962.

The present invention relates to an abrasive cut-off disk or wheel and, more particularly, to such disks of the type formed by a strong, circular sheet metal drive disk or core having a plurality of circumferentially spaced arcuate cutting segments secured around its periphery. The arcuate cutting segments typically are composed of diamond dust or fragments used as an abrasive and held dispersed and embedded in a metallic matrix. The cutting segments frequently are manufactured by cold pressing or hot pressing the various ingredients introduced into a suitable mold in powder form. The segments prepared in this manner or any other suitable manner are secured to the periphery of the metal drive core by silver soldering or are brazed on. Occasionally it is desirable in a segment containing diamond dust to isolate the brazed joint attaching the base of the segment to the drive core from the diamond bearing section of the segment. For this purpose, a cutting segment of this type sometimes is composed of an outermost diamond bearing section and an inner section of a diamond free material commonly known as a backing.

Abrasive cut-off disks of the kind described are used for instance in cutting hard non-metallic materials such as concrete, marble, tile, and the like. Of course, it is desirable to design the cutting segments so that their cumulative effect produces a superior cutting action while having a longer life than is the case with the other cut-off disks of this type.

An object of the invention is to provide a new and improved method of making an abrasive cut-off disk of the kind having a metallic drive core to the periphery of which are secured at circumferentially spaced points a plurality of arcuate cutting segments made of an abrasive material.

Another object is the provision of a generally improved and more satisfactory method of making an abrasive disk of the kind described designed so as to have an improved cutting action and longer life as compared with other abrasive disks of this type.

Yet another object is to provide a simple and effective method of making an arcuate cutting segment for attachment to a metallic drive core having a section composed of diamond fragments embedded in a metallic matrix in an arrangement such that the segment has a good performance and a long useful life.

A further object is the provision of a method or process which results in a better backing section in a cutting segment of the type having an outer diamond bearing section and a backing of diamond-free material, resulting in a longer life for the segment.

These and other desirable objects may be attained in the manner disclosed as an illustrative embodiment of the invention in the following description and in the accompanying drawings forming a part thereof, in which.

The same reference numerals throughout the several views indicate the same parts.

Figure 1:
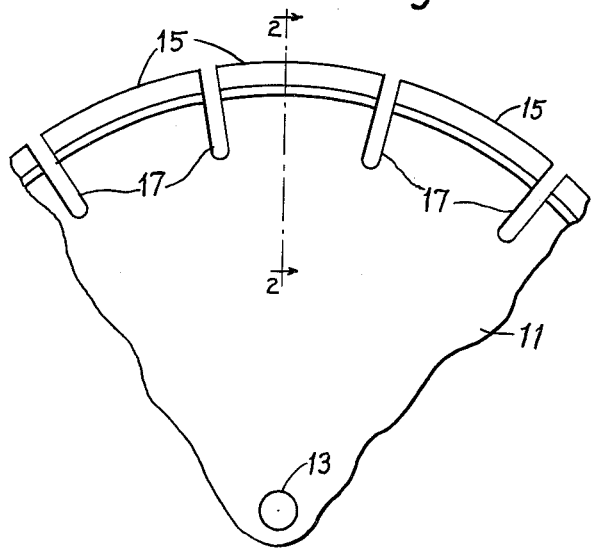
FIG. 1 is a fragmentary face view of a cut-off disk to the periphery of which are secured arcuate diamond-bearing cutting segments according to the invention.
Figure 2:
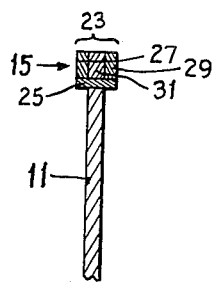
FIG. 2 is a fragmentary radial cross-section of the cut-off disk of FIG. 1 taken approximately on the line 2—2 thereof.

In FIG. 1 is illustrated an abrasive cut-off disk or wheel constructed in accordance with the invention. The cut-off wheel includes a central sheet metal drive disk or core 11 made of a suitable wrought metal such as steel and provided with a central aperture 13 for mounting the disk on a rotating shaft. Secured around the periphery of the core 11 are a plurality of circumferentially spaced arcuate cutting segments 15 preferably silver soldered or brazed in an appropriate manner to the outer edge of the core. Desirably the outer edge portions of the core 11 are divided into a plurality of equal circumferential segments by a number of radially extending slots 17. The core 11 is a strong circular sheet metal disk having, as better seen in FIG. 2, a lesser thickness than that of the arcuate segments 15 secured to the periphery thereof, which are approximately 1/16 inch to 1/4 inch in thickness.

Figure 3:
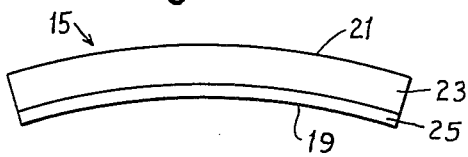
FIG. 3 is an enlarged side elevational view of the cutting segment shown in FIGS. 1 and 2 according to a first embodiment of the invention.

Each of the cutting segments 15 is rectangular in cross section and arcuate when viewed from the face as is more evident in the enlarged view of FIG. 3. The inner radius of the base 19 of each segment 15 is substantially the same as the outer radius of the core 11, the outer arcuate edge 21 of the segment being approximately concentric with the inner radius. The segment 15 is of the type having diamond dust or fragments used as an abrasive and held dispersed and embedded in a suitable metallic matrix. In the cutting segment illustrated, the diamond dust is embedded only in the outer arcuate section 23 of the segment, the inner arcuate section 25 being free of diamond dust. The inner portion 25 is commonly known as a backing, and the purpose of this backing will be made evident in the discussion to follow.

Figure 4:
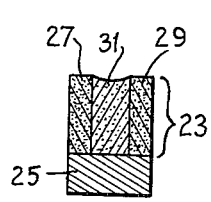
FIG. 4 is a cross-sectional view to an enlarged scale of the segment of FIG. 3.

It has been shown in the use of abrasive cut-off wheels that a superior cutting action is obtained when the wheel is made to wear preferentially in the center so that the outer edge 21 of the wheel bearing on the work is concave with respect to the surface being cut. This is illustrated in FIG. 4 for a disk which has been in service for a short while. To secure differential wearing so that this concave edge surface results, the content of the abrading material provided by the diamond dust in the outer diamond-bearing section 23 is increased on each side in a sandwich arrangement. Thus the two outer side layers 27 and 29 in the diamond-bearing section 23 have a greater diamond content than that of the central portion or layer 31.

As has been mentioned, the diamond dust or fragments in the section 23 are held dispersed and embedded in a metallic matrix. Any suitable matrix may be used in carrying out the invention, the common metallic matrices for this type of cutting segment being bronze, nickel, cupro nickel, various iron alloys, and tungsten carbide.

The cutting segment shown in FIGS. 1-4 is provided with the mentioned backing or inner section 25 which is free of diamond dust. This backing is made of the same metal as provides the matrix in the section 23 and therefore is also known as a "blank." The purpose of this backing is that on occasion it is desirable to isolate the silver solder or brazed joint attaching the segment 15 to the core 11 from the diamond bearing section of the segment in order to secure a better joint and improved performance. It is entirely possible, though, to utilize for certain purposes a cutting segment of the kind illustrated in FIG. 5 wherein the backing has been omitted. This cutting segment 33 is composed of a sandwich type of diamond-bearing layers identical to that described for the section 23 in the embodiment of FIG. 4. The layers 27' and 29' are identical to the layers 27 and 29 and have the same diamond content embedded in an identical metallic matrix, and the central layer 31' is identical to the layer 31 and has a correspondingly lower diamond content.

Figure 5:
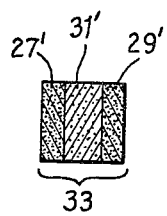
FIGS. 5 and 6 are views similar to FIG. 4 of cutting segments according to a second and third embodiment, respectively, of the invention.

The cutting segments of FIGS. 4 and 5 may be manufactured in a number of ways. As one example, a segment of the desired dimensions may be cold pressed by introducing into a suitable mold a powder mixture of the matrix metal and diamond dust in varying proportions. Of course, to manufacture the segment with the backing as in FIG. 4, an additional quantity of blank matrix metal is also introduced. The first layer placed in the mold may have, for example, a diamond content of 36 to 72 carats per cubic inch of final volume. The second or center layer may have a diamond content of 9 to 18 carats per cubic inch, and a final layer equal to the first in diamond content with 36 to 72 carats per cubic inch. The first and final layers, which become the two sides of the segment, may then be compressed to a final dimension of $1/64$ inch to $1/32$ inch and the center layer to $3/32$ inch to $1/16$ inch. These dimensions, of course, are for a particular example and are not intended to be limiting. The sandwich pressed in the manner may then be sintered by classical and well known methods. Alternatively, the same result may be accomplished by cold pressing the layers as indicated and then subsequently hot pressing the compacted mass. A suitable graphite hot pressing die which may be utilized is described in applicant's copending patent application filed April 22, 1959, Serial No. 808,195, now Patent 3,069,816, granted December 25, 1962.

Instead of cold pressing the original compact sandwich layers, the requisite amount of matrix metal and diamond dust for the various layers may be sintered or fritted loose in a carbon mold to form a slug or preform that may readily be handled and inserted in a cold press or hot press mold. These discrete layers may then be fused or compressed together by the application of heat and pressure or alternatively of pressure and a subsequent application of heat.

The times, temperatures, and pressures used in the pressing operation are the conventional times, pressures, and temperatures well known in the art.

A cutting segment 15 or 33 manufactured in the described manner has a superior cutting action when its outer edge bearing on the work wears preferentially in the center to a concave shape. The improved cutting action is obtained by the better effect of the edges of the segment initially starting the cut rather than the center section or layer. A cutting disk and segment of longer life is obtained by the elimination of the high pressure on the central section of the segment and the subsequent fast breakdown due to pressure.

The blank metal backing section 25 provided inwardly of the diamond-bearing section 23 in the embodiment of FIG. 4 is advantageous for some uses. It has the disadvantage, though, that this type of backing is sometimes badly worn by the swarf or cuttings as the wheel turns during operation. Instead of making the backing of matrix metal as explained, it is possible to make the backing of matrix metal containing a hard wear resistant material such as tungsten carbide, aluminum oxide or the like, but this kind of backing may protrude sufficiently as the cutting segment is worn to cause binding or seizing of the wheel in the cut. To avoid this effect, a cutting segment as shown in FIG. 6 employing a layered or sandwich arrangement in the backing section is provided.

Figure 6:
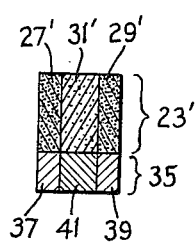

In FIG. 6, the diamond-bearing outer section 23' is identical to the section 23 previously described and is composed of as before of two outer layers of relatively high diamond content dispersed and embedded in a suitable metallic matrix and a central layer of lower diamond content in the metallic matrix. A backing section 35 is located, of course, inwardly of the section 23' and is integral therewith. For this embodiment, a layered structure is manufactured having two outer layers 37 and 39 of blank matrix metal between which is disposed a central layer 41 of abrasive resistant material. The abrasive resistant material may be matrix metal containing tungsten carbide, aluminum oxide, or the like.

In the operation of a cut-off disk having cutting segments according to FIG. 6, the outer layers 37 and 39 are worn away after a period of use and subsequent wearing of the backing is materially retarded in the central section 41 of abrasion resisting material. The reduced size of the backing substantially prevents seizing or binding of the wheel in the cut as the cutting segment edge wears down. As a result, the segment has a good performance over a longer period of use. The segment according to FIG. 6 may be manufactured in a manner similar to that described for the segments of the other embodiments.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The method of making an abrasive element having greater wear resistance at its lateral edges than in its central portion, which comprises the steps of mixing a first batch of powdered matrix metal with a sufficient quantity of diamond particles to provide a relatively high concentration of diamond particles in the mixture of the first batch, mixing a second batch of powdered matrix metal with a relatively lesser quantity of diamond particles to provide a substantially lesser concentration of diamond particles in the mixture of the second batch, placing a layer of the mixture of the second batch between two layers of the mixture of the first batch in sandwich fashion, and compacting the three layers under heat accompanied by pressure applied approximately perpendicular to the lines separating the layers from each other, to form from the three layers an integrally united abrasive element having a lower concentration of diamond particles and lower wear resistance in its central layer as compared with the diamond particle concentration and wear resistance of its outer layers.

2. The method of making an abrasive cut-off disk having a peripheral cutting face with greater wear resistance at its lateral edges than at its center, which comprises the steps of providing a steel core having a periphery, providing a series of abrasive elements each made according to the method of claim 1, and affixing said abrasive elements to said core at spaced intervals around the periphery thereof by solder or the like.

3. The method of making a diamond bearing abrasive cut-off disk having a peripheral cutting face with greater wear resistance at its lateral edges than at its center, which comprises the steps of providing a sheet metal core having a periphery at least portions of which are arcuate with respect to a common center, mixing a first batch of powdered matrix metal with a sufficient quantity of diamond particles to provide a relatively high concentration of diamond particles in the mixture of the first batch, mixing a second batch of powdered matrix metal with a relatively lesser quantity of diamond particles to provide a substantially lesser concentration of diamond particles in the mixture of the second batch, placing an arcuate layer of the mixture of the second batch between two arcuate layers of the mixture of the first batch in sandwich fashion, compacting the three layers by pressure and fusing them by heat to form an integrally united abrasive element having an inner arcuate face of concave curvature, an outer arcuate face of convex curvature substantially concentric with said inner arcuate face, and two lateral faces so substantially plane shape, at least the radially outermost portions of said plane faces and the laterally outermost portions of said convex face being formed from material from said first batch and the central portion of said convex face being formed from material from said second batch, repeating the element forming steps to produce a plurality of such abrasive elements, and affixing said abrasive elements to said sheet metal core at intervals around the arcuate portions of the periphery thereof.

4. The method of making a diamond bearing abrasive cut-off disk having a peripheral cutting face with greater wear resistance at its lateral edges than at its center, which comprises the steps of providing a sheet metal core having a periphery at least portions of which are arcuate with respect to a common center, mixing a first batch of powdered matrix metal with a sufficient quantity of diamond particles to provide a relatively high concentration of diamond particles in the mixture of the first batch, mixing a second batch of powdered matrix metal with a relatively lesser quantity of diamond particles to provide a substantially lesser concentration of diamond particles in the mixture of the second batch, placing an arcuate layer of the mixture of the second batch between two arcuate layers of the mixture of the first batch in sandwich fashion and placing a quantity of powdered diamond-free matrix metal in position to make contact with one edge of all three of said layers, compacting the powdered metal by pressure and fusing it by heat to form an abrasive element having an inner concave face of diamond free metal, two lateral plane faces of metal from said first batch, and an outer convex face the central portion of which is of metal from said second batch and the laterally outer portions of which are of metal from said first batch, repeating the element forming steps to provide a plurality of such elements, and affixing such elements to said sheet metal core at intervals around the arcuate portions of the periphery thereof, with the diamond free concave faces of the elements next to the periphery of the core.

5. The method of making a diamond bearing abrasive cut-off disk having a peripheral cutting face with greater wear resistance at its lateral edges than at its center, which comprises the steps of providing a sheet metal core having a periphery, providing a first supply of powdered matrix material containing a relatively high concentration of diamond particles, providing a second supply of powdered matrix material containing a substantially lesser concentration of diamond particles, providing a third supply of powdered matrix material containing substantially no diamond particles, placing a quantity of matrix material from each of said three supplies in position to form an abrasive element having an inner face, an outer face of convex arcuate shape, and two substantially plane lateral faces, arranging the quantities of powdered matrix material in such locations that the inner face of the abrasive element will be formed mainly of material from said third supply, the central portion of the outer arcuate face of the element will be formed mainly of material from said second supply, and the two lateral edges of the outer arcuate face will be formed mainly of material from said first supply, applying heat to the quantities of matrix material to bond them securely together to make a rigid abrasive element, and bonding the abrasive element to a portion of the periphery of the sheet metal core with said inner face of the element faced inwardly toward the center of the core.

References Cited by the Examiner
UNITED STATES PATENTS

| | | | |
|---|---|---|---|
| 2,268,599 | 1/42 | Kinney et al. | 51—206 |
| 2,877,105 | 3/59 | Smith | 51—308 |
| 3,049,843 | 8/62 | Christensen | 51—206 |

ALEXANDER H. BRODMERKEL, *Primary Examiner.*

MORRIS LIEBMAN, *Examiner.*